(12) United States Patent
Karlsson

(10) Patent No.: US 7,559,398 B2
(45) Date of Patent: Jul. 14, 2009

(54) LIFTING DEVICE

(75) Inventor: Mikael Karlsson, Grästorp (SE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 10/591,655

(22) PCT Filed: Feb. 24, 2005

(86) PCT No.: PCT/SE2005/000260

§ 371 (c)(1),
(2), (4) Date: Aug. 27, 2007

(87) PCT Pub. No.: WO2005/085014

PCT Pub. Date: Sep. 15, 2005

(65) Prior Publication Data

US 2008/0136140 A1    Jun. 12, 2008

(30) Foreign Application Priority Data

Mar. 5, 2004   (SE) .................................. 0400550

(51) Int. Cl.
*B60K 28/10* (2006.01)
(52) U.S. Cl. .................. 180/274; 280/755; 280/763.1; 296/187.04; 296/193.11
(58) Field of Classification Search ................. 180/274, 180/69.2; 280/754, 755, 763.1, 766.1; 296/187.04, 296/193.11
See application file for complete search history.

(56) References Cited

U.S. PATENT DOCUMENTS

| 3,737,136 | A | * | 6/1973 | Snurr | 248/412 |
| 3,874,682 | A | * | 4/1975 | Dalton | 254/419 |
| 4,188,049 | A | * | 2/1980 | Kimbro | 280/766.1 |
| 5,340,152 | A | * | 8/1994 | Fohl | 280/805 |
| 5,788,402 | A |   | 8/1998 | Banda | |
| 5,871,235 | A | * | 2/1999 | Wier | 280/806 |
| 7,000,720 | B2 | * | 2/2006 | Polz et al. | 180/69.21 |

FOREIGN PATENT DOCUMENTS

| DE | 19727590 C1 | 7/1998 |
| DE | 10002723 A1 | 7/2001 |
| DE | 10249272 A1 | 5/2004 |
| EP | 1160136 A1 | 12/2001 |
| WO | WO 02/09983 A2 | 2/2002 |

* cited by examiner

*Primary Examiner*—Toan C To
(74) *Attorney, Agent, or Firm*—Ingrassia Fisher & Lorenz, P.C.

(57) ABSTRACT

The present invention relates to a lifting device (1) to be mounted in a motor vehicle and intended, in case the vehicle is involved in an accident, to be activated by putting a lifting element (5) being spring-tensioned in the lifting device in motion, wherein the lifting device comprises a locking device (7) intended to cooperate with the lifting element (5) for locking it in a spring-tensioned position, and a release mechanism (9) intended to release the locked lifting element (5) so it can be put in motion under the influence of the spring tension. The invention is characterised in that the release mechanism (9) comprises a striking element (37) intended to release the locked lifting element (5) by means of striking-pin action.

15 Claims, 3 Drawing Sheets

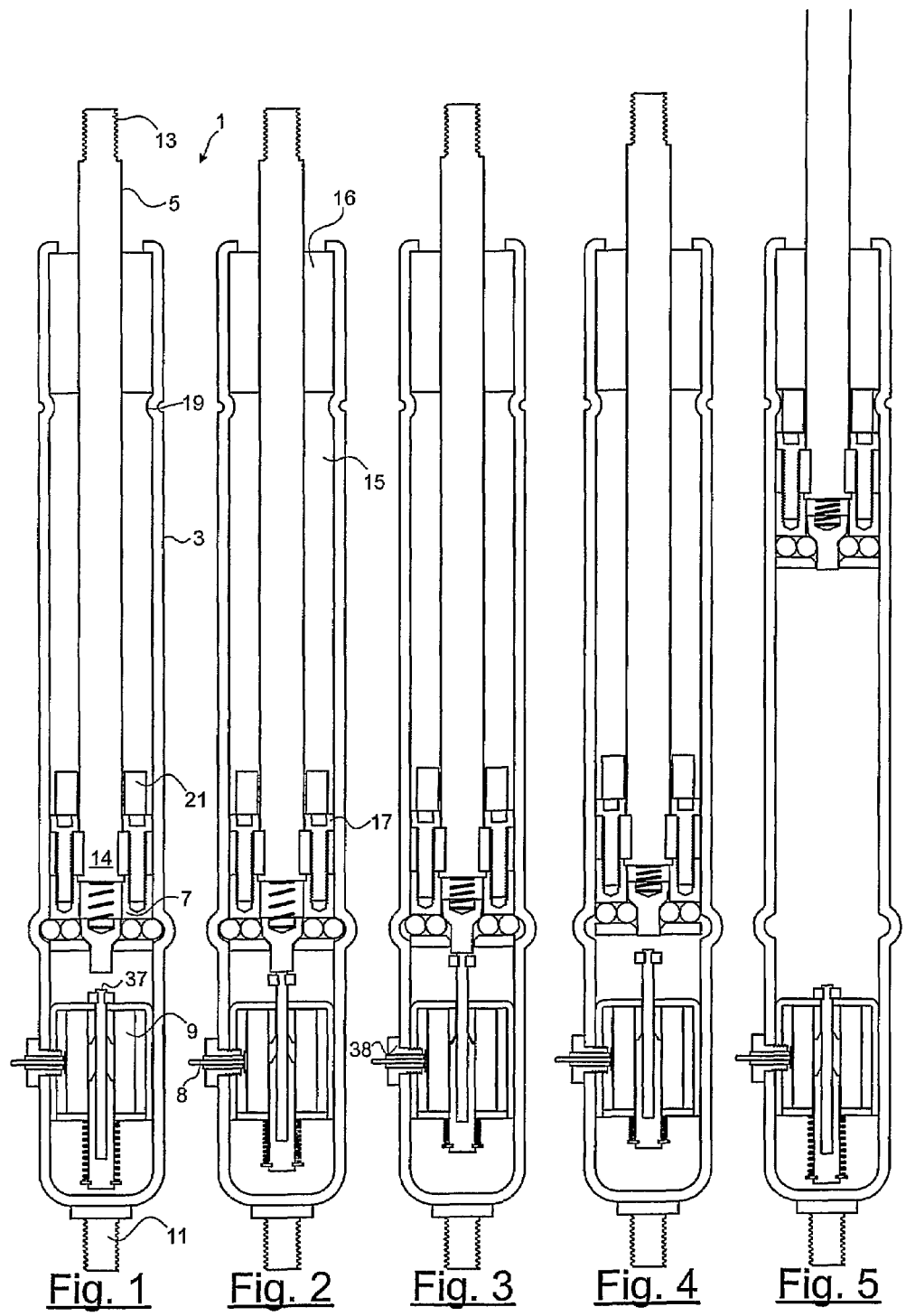

LIFTING DEVICE

TECHNICAL FIELD

The present invention relates to a lifting device according to the preamble of claim 1.

BACKGROUND

In modern private cars it is often desirable from design reasons to have as little space as possible between the hood of the vehicle and the components within the engine house, so that a low and advantageous profile can be attained. Moreover, it is desirable to make the engine house as small as possible, which implies that different components will be located closely to each other in the engine house. The consequence is that the hood has little ability to deform downwards when it is hit by a soft object, such as a hit pedestrian that is thrown up on the hood. The risk for serious injuries when a hit pedestrian strikes the hood can be devastating.

In the aim to reduce such a risk, it has been proposed that when a pedestrian is hit the hood is raised to provide for an increased deformation space. When a pedestrian is hit, the idea has been to quickly raise the rear portion of the hood, while the front portion remains locked to the body of the vehicle by means of a regular hood lock at the front of the hood. This is appropriate for speeds within low intervals of about 20-60 km/h, since the benefits of such a hood raising decreases at higher collision speeds.

An important aspect is the lifting devices that are intended to facilitate the quick raising of the rear portion of the hood, which is required to provide for the above mentioned deformation space. Future laws for the protection of pedestrians are expected to require that the rear edge of the hood can be raised in a few hundredths of a second, why the performance of the lifting device will be focused on.

Yet a desire for these lifting devices is that they can be made reversible, i.e. that the lifting device can be restored to its original position after its activation, e.g. when colliding with an other object than a pedestrian and the hood is raised in any case. Often, pyrotechnical solutions are used to activate the lifting device, but these are not reversible in that sense, but must be replaced by a new pyrotechnical unit in the case the lifting device has been activated. Moreover, they require reliable information regarding the accident so that unnecessary activations are avoided, which implies extensive detection and data processing equipment.

Instead, it has been proposed that electromagnets in the form of solenoids are used for activating the lifting device. These are reversible why the above mentioned detection and data processing equipment can be made less comprehensive. Additionally, the system is active as well as pedestrian friendly after each restoration, unlike pyrotechnical systems which require replacements at a garage to become functional again.

RELATED ART

U.S. Pat. No. 5,788,402 discloses a lifting device 1 connected to a "crash frame" of a motor vehicle to be activated in case the motor vehicle is involved in an accident. Normally, the balls 4 lock the spring-tensioned lifting device 1 against movement by engaging a groove 5 in a lower part of the lifting device. During activation, a ring shaped locking unit 6, which also forms the movable part of a solenoid 10, will move upwards (seen in FIG. 1) against the bias of the spring 7 and push it upwards, whereby the balls 4 can fall obliquely downwards and release its engagement with the groove. The lifting device 1 will then be pushed upwards by means of the spring force. After this suspension, the spring 7 will push the locking unit 6 back, which in turn pushes the balls 3 back to their original positions. At a later stage, when the lifting device 1 is pushed downwards, so as to restore it to its original position its tip will press beyond the balls 4, which again will engage the groove 5 and thereby lock the lifting device.

A disadvantage with this construction is that the locking unit 6, due to its ring shape, and since it is made from a magnetic material, becomes rather heavy which will result in a high power consumption and a slow activation of the locking unit.

WO 02/09983 A2 discloses a lifting device for a motor vehicle which in the case of a collision can be activated so as to lift the rear edge of the hood of a vehicle. A lifting element 2 is spring-tensioned by means of a compression spring 3. A spherical element 4 is arranged to cooperate with a housing 9 and a conical operating element 5, which is spring-tensioned by means of the spring 6. In this way, the spring-tensioned lifting element can be locked against movement in the vertical direction. When activating the lifting device, a not shown electromagnet 8 being mounted to the horizontal wall 9 and connected to the operating element 5, can pull the operating element downwards against the bias of the spring, whereby said locking action ceases and the lifting element 2 can be pushed upwards under the influence of the spring 3. Thereafter, the operating element 5 is returned to its original position.

A disadvantage with this construction is that a powerful spring is required. The reason is that the lifting device itself is more sensitive to accelerations in the negative Z-direction than in the positive Z-direction, since the operating element and also the solenoid release the lifting element by a movement in the Z-direction. This means that to avoid releasing of the lifting device by mistake, for example during driving on an uneven ground, the spring must be stiff which put great demands on a powerful electromagnet. The sleeve shape makes the operating element 5 heavy, which results in a powerful electromagnet 8 and thereby that the system becomes slow and energy-intensive.

The problem with powerful solenoids, i.e. a solenoid that can mobilize a large force is that the moveable components of the solenoid have a heavy mass. Moving heavy masses require more energy than moving small masses, and the devices that are required to provide for such a high power consumption are in general space requiring, e.g. capacitors, which is not desirable in a motor vehicle. An other problem is that heavy movable parts implies slow solenoids due to the influence of inertial forces. Thus, it can be difficult to comply with coming laws for lifting devices if large and powerful solenoids are to be used.

OBJECT OF THE INVENTION

An object of the present invention is to provide a lifting device that quickly and simply can be activated and which is not associated with the above mentioned disadvantages.

An other object of the invention is to provide a lifting device comprising a release mechanism that works according to a principle that is advantageous when future laws concerning activation times for lifting devices are to be observed.

SUMMARY OF THE INVENTION

These and other objects of the invention are achieved by means of a lifting device as initially defined and with features according to the characterizing portion of claim 1. Since the release mechanism comprises a striking element to act with a striking pin action for releasing the locked lifting element, the striking element will act quickly and with power, which are important factors when the lifting device is to be activated.

Preferably, the locking device comprises a plurality of spherical elements and an operating element being movable in the lifting direction of the lifting element, wherein the striking element is situated at a distance from the operating element and intended to strike the operating element for moving it from a first position, in which it cooperates with the spherical elements so as to lock the lifting element in the lifting direction, to a second position, in which the locking action cease. Unlike the releasing mechanisms in related art lifting devices, the striking element is situated at a distance from the operating element, which implies that only the mass of the striking element needs to be accelerated. Consequently, a quick reaction time is achieved from the moment when the striking element is released to the moment when it hits the operating element. At the same time, the striking element will have an inherent kinetic energy due to its velocity in the moment when it hits the operating element, which increases the initial force by which the striking element hits and moves the operating element.

Suitably, the second position is situated above the first position. Since the operating element has to move from a lower position to an upper position so as to release the lifting element, the operating element becomes less sensitive to accelerations in the Z-direction, for example a strike-through of the spring system when driving on an uneven road, which thereby minimize the risk for an unintended activation of the lifting device.

Preferably, the striking element is intended to strike the operating element from below. Hereby, the striking element becomes less sensitive to accelerations in the Z-direction, for example driving on an uneven road which thereby reduces the risk for an unintended activation of the lifting device.

Suitably, the lifting device comprises a housing extended in the lifting direction, in which housing the lifting element, the locking device and the release mechanism are arranged, wherein the operating element when situated in the first position, the spherical elements are held in a radial outer position with respect to the lifting direction, and in which they are engaged with the housing for locking the lifting element with respect to the housing, and when situated in the second position, the spherical elements have been moved to a radial inner position, in which they no longer are engaged with the housing. Due to the housing, the lifting element, the locking device and the release mechanism will be protected against the environment and thereby against impacts, corrosive environment, etc. Additionally, this solution also implies that a low release force is required for releasing a large tensioned force, which facilitates the use of a small, quick electromagnet having a "low" energy consumption.

Preferably, the housing comprises on the inside of the housing a circumferentially extended cavity for receiving the spherical elements when they are held in the radial outer position. Hereby is achieved a simple and efficient way of locking the lifting element in respect of the housing.

Suitably, the locking device comprises radially extended ducts in which the spherical elements are movably arranged, and preferably each duct comprises a plurality of successively arranged spherical elements. Since each duct contain several spherical elements, the operating element can be made smaller without affecting the locking action, provided given dimensions of the housing. A smaller operating element means a less heavy operating element, which is advantageous when it is to be moved from the first position to the second position. Additionally, an easy operating element is less sensitive to accelerations in the Z-direction compared to a heavy operating element.

Preferably, the locking device forms part of the spring-tensioned lifting element, and the spherical elements are arranged in the locking device in such a way that said spring tension forces the spherical elements, from the radial outer position, to the radial inner position when the operating element has reached the second position. Hereby, the releasing of the lifting element becomes faster and is simplified without affecting the locking force itself.

Suitably, the operating element comprises an upper substantially cylindrical portion and a lower cylindrical portion, the upper portion having a larger diameter than the lower portion, wherein the upper portion is intended to be in contact with the spherical elements when the operating element is situated in the first position, so as to hold the spherical elements in the radial outer position. With this construction, a space is formed for the spherical elements only when the operating element is moved from the first position to the second position. This implies that the lifting device becomes less sensitive to accelerations in the X- and Y-directions, e.g. a collision with an other vehicle, since neither the spherical elements nor any other parts of the lifting device can be moved in these directions without first moving the operating element to the second position.

Preferably, the operating element is resiliently arranged by means of a compression spring in the locking device in such a way that the spring is tensioned when the operating element is moved from the first position to the second position, and suitably the spring constant of the compression spring is chosen so that the spherical elements will be put in motion towards the outer position, when the operating element is moved from the second position to the first position, in situations when the lifting element is pushed in the opposite direction as the lifting direction and the spherical elements reach the radial outer position. Hereby, the operating element can affect the spherical elements in the direction of radial outer position, which facilitates locking of the lifting element.

Suitably, is inclined with an angle $\beta$ of 1-10°, slightly outwards seen in the lifting direction. Hereby it becomes easier to move the spherical elements in the direction of the radial outer position.

Preferably, the housing forms a pressure tight space in which an overpressure can prevail and where the lifting element is intended to function as a piston in a gas spring. With a gas spring it becomes possible to control lifting and damping performance of the lifting device as desired. Due to the gas tight space, the release mechanism is fully protected against hostile corrosive environment. In this context it is suitable to mention that the striking element forms of a low-resistant pushing solenoid.

Suitably, the angle between the tangent, in the point where the spherical elements are in contact with the cavity when the operating element is situated in the first position, and the horizontal plane lies within the interval 20-40°. Hereby, the angle is enough big so that the risk for the spherical elements to become self-locked in the cavities is avoided, at the same time as it is enough small so that the radial load on the operating element do not become larger than that the friction can be overcome by the impact effect and by the compressive force of the striking element.

SHORT DESCRIPTION OF THE DRAWINGS

The invention will now be described with reference to the appended drawings, on which:

FIG. 1-5 show five steps during activation of a lifting device according to the invention.

Figure 6:
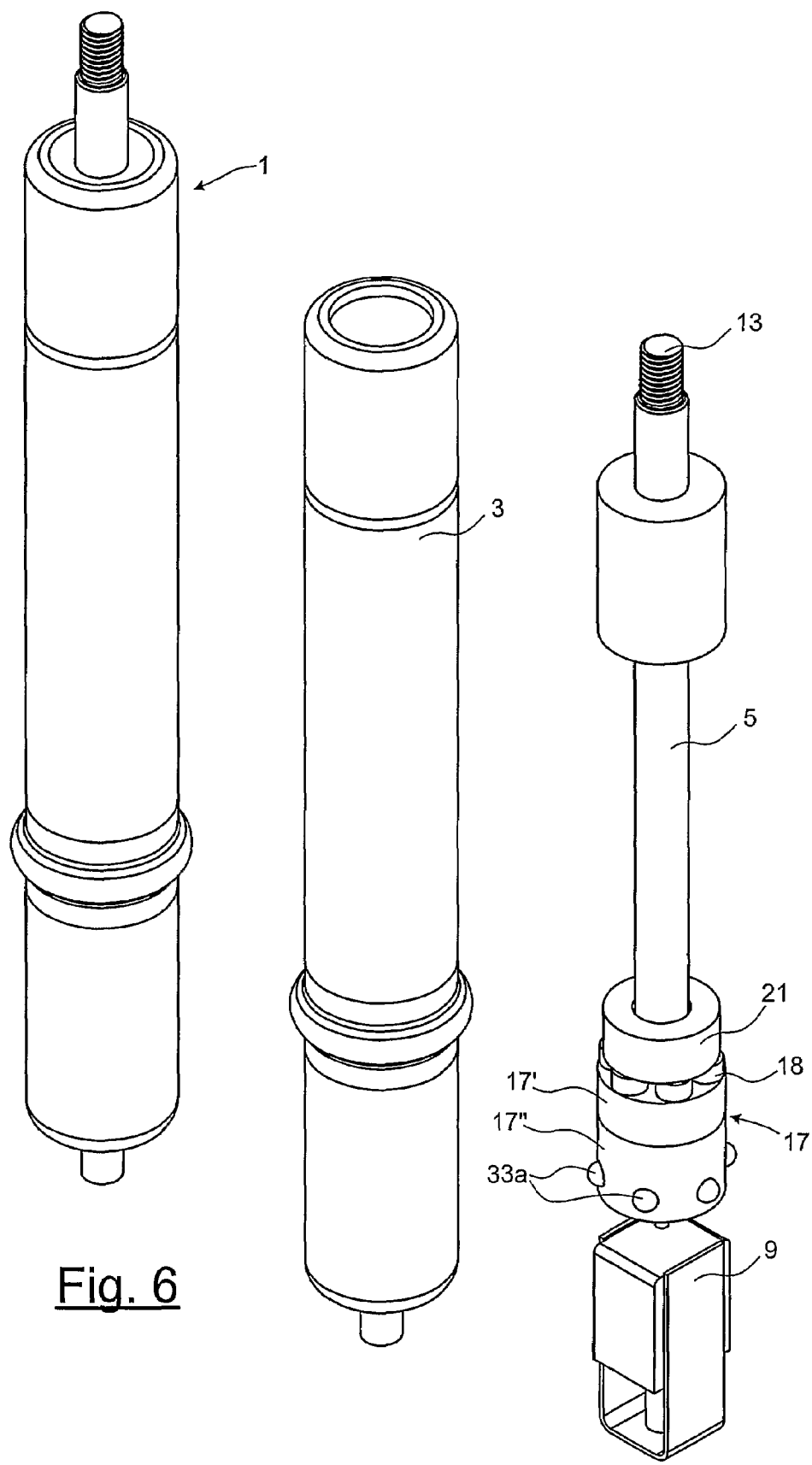
FIG. 6 shows a perspective view of an disassembled lifting device according to the invention.

DESCRIPTION OF A PREFERRED
EMBODIMENT OF THE INVENTION

FIG. 1-5 shows a lifting device 1 according to a preferred embodiment of the invention to be mounted in a motor vehicle for lifting the rear portion of the hood in case of a collision with a pedestrian. The lifting device comprises an elongated gas spring 3 with a lifting element in the form of a piston stem 5 which is movable in the longitudinal direction of the lifting device, a locking device 7 for locking the piston stem in a spring-tensioned position and a release mechanism 9 for releasing the spring-tensioned locked piston stem when receiving an electrical signal, via a wire 8, from a not shown collision detector. The lifting device is mounted with a lower portion 11 in the body of the vehicle, preferably in cooperation with a multijoint hinge. Two lifting devices are intended to be mounted in a not shown hood—one on each side of the engine house.

In normal operation, i.e. not activated mode and which is depicted in FIG. 1, the piston stem is situated at its lowermost position and is spring-tensioned with a high spring force due to a high internal pressure. In case of a collision with a pedestrian, an electrical impulse from the not shown collision detector will be sent to the release mechanism 9, via the wire 8, whereby it releases and affects the locking device 7 (FIG. 2) to release the piston stem 5, so it starts to push upwards (FIG. 3-4) by means of the spring force until it reaches its uppermost position (FIG. 5). Hereby, the rear edge of the hood will be suspended so that the deformation space is formed between the hood and the engine components located in the engine house. In fully released position (FIG. 5), the rear portion of the hood will be springing in the longitudinal direction of the gas spring (henceforth referred to as Z-direction), whereby multiple strikes against the hood by, e.g. a hit pedestrian effectively can be absorbed and becomes balanced by the gas spring.

The gas spring comprises a tube shaped, elongated housing 3 with a circular cross section. The housing has an upper end which is open to the environment and which is sealed by means of a ring shaped sealing 16 having an outer and an inner diameter. The piston stem 5 can run through the ring shaped sealing 16, which with its circumferential surface can seal against the inner side of the housing and with its inner circumferential surface seal against the perimeter of the piston stem. The housing 3, the piston stem 5 and the ring shaped sealing 16 form a closed, gas tight space 15, in which a compressed gas is contained. The pressure in this closed space is high, about 200 bar, even if this can vary depending on application, but according to the embodiment of the invention a pressure of 200 bar implies that the piston stem 5 has a dammed up force of about 1 kN when it is situated in its bottom position and still (up to 0.9 kN) when it is situated at its top position (pressure difference due to the change of volume within the space when the piston stem is projected).

One end 13 of the piston stem is as described above connected to the rear edge of the hood, while the other end 14 is connected to a cylinder shaped piston 17. The piston stem 5 and the piston 17 can together move within the closed space 15, between two end positions, a lower position in which the piston stem is fully inserted in the housing, and an outer position in which the piston stem is substantially fully projected. The closed space 15 will thus be dived into two closed subspaces; one above the piston and one below the piston. Not shown ducts extend in the longitudinal direction of the housing through the piston 17, alternatively are recessed in the inner surface of the housing 3 so that the upper and lower subspaces are in fluid communication with each other. By varying the shape of these ducts, the lifting device can achieve desired lifting and damping characteristics, respectively.

The ring shaped seal 16 also works as a stop element 16 and has as an object to define the upper position of the piston stem. The stop element 16 is held by a circular flange 19 arranged on the inside of the housing and forms a constriction 19 of the housing with a lesser cross-section compared to the other parts of the housing. About the piston stem 5, a ring shaped strike absorbing element 21 is arranged. When the lifting device 1 is activated and the piston stem 5 is suspended, the ring shaped element 21 together with the piston 17 will abut against the stop element 21 so that a continued movement of the piston stem 5 is prevented. This ring shaped element 21 is preferably made of a substantially soft, strike absorbing and energy absorbing material, such as cellular plastic or foam rubber.

When the piston is situated in the inserted position, it is spring-tensioned with a force that among others is proportional to the pressure that prevails in the closed space 15. To hold the piston stem 5 in this spring-tensioned position, a locking device is required. It must in case of a collision with a pedestrian be able to quickly and simply be forced so that the inherent force of the piston stem 5 can be released in a proper way.

Figure 7:
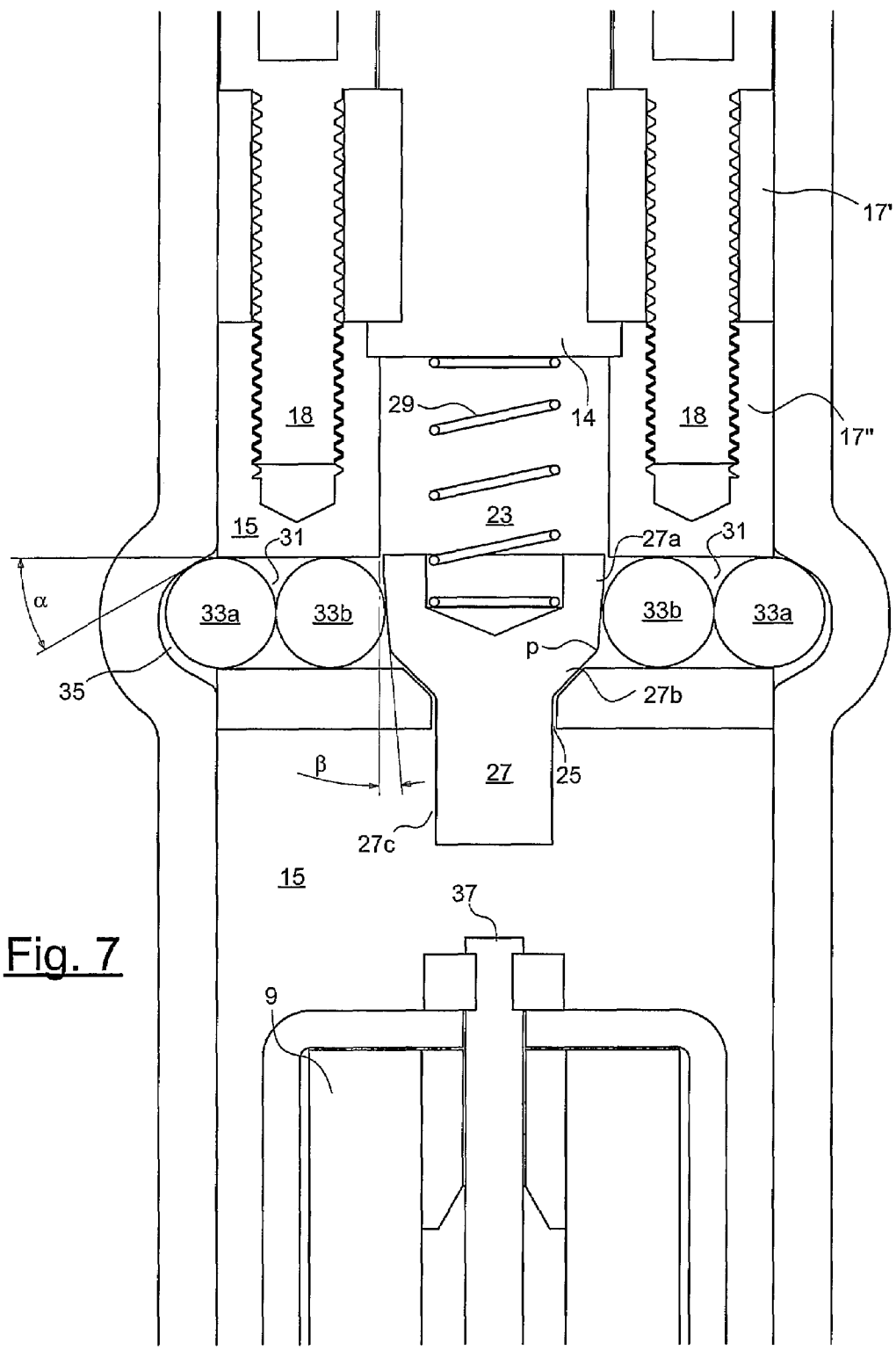
FIG. 7 is an enlargement view of the encircled area in FIG. 1.

The description of the locking device and the release mechanism will be performed mainly with reference to FIG. 6-7. The piston is divided in an upper section 17' and a lower section 17", which are connected to each other by means of a screw joint 18 (see FIG. 6). The lower section 17", in which the locking device is arranged, is provided with a cylindrical recess 23 in the longitudinal direction, i.e. the lifting direction, and the lowermost end 14 of the piston stem 5 projects into the cylindrical recess. The recess 23 extends through the whole lower section 17" and debouches in an opening 25 on an underside of it. The cross-section of an upper part of the recess is larger than the cross-section of the lower part, and from which the opening debouches on the underside. There between, a cone shaped part that connects the upper and the lower part is situated.

An operation element 27 in the form of a cylindrical pin 27 is arranged in the cylindrical recess 23 and movably connected to the lowermost end 14 of the piston stem via a spring element 29 in the shape of a compression spring. The pin 27 can resiliently move upwards and downwards in the longitudinal direction (Z-direction) of the recess 23, and comprises an upper 27a slightly cone shaped part and a lower cylindrical part 27c as well as an intermediate conical part 27b that connects the upper and the lower part. The upper part 27a has a larger diameter than the lower part 27c in analogy with what applies for the recess 23.

As is shown in FIG. 7, the upper portion 27a of the pin is inclined slightly outwards, seen in the suspension direction and forms an angle β of about 5° with respect to the Z-direction. When the pin is situated in its lowermost position, the spring has a small tension, and its lower part projects from the opening 25 on the underside of the piston. This opening 25 is somewhat larger than the lower portion of the pin 27c, but smaller than the upper portion of the pin 27a. Moreover, the opening 25 is conical having the same inclination as the intermediate part 27b that connects the upper part with the lower part, which taken together means that the pin 27 can move within the recess, but only the lower portion of the pin 27 can project out from the recess 23.

From the part of the recess 23 having the larger diameter, six cylindrical ducts 31 (of which two are shown in FIG. 7) extend in the radial direction, each of which debouch in the mantle surface of the piston. The ducts 31 are symmetrically distributed in the circumferential direction. Thus, each duct 31 forms an outer and an inner aperture, where the latter debouches in the recess.

In each duct, two spherical elements 33a-b are movably arranged, which can be moved between the outer and the inner aperture. The spherical elements are preferably made from a hard material, such as steel or a ceramic material.

In normal position, which is depicted in FIG. 7, the piston 17 is situated in a depressed bottom position, in which it is locked and not can be lifted in the lifting direction. The pin 27 is situated in a first, lower position, in which the lower part 27c of the pin projects out from the underside of the piston, while the mantle of the upper part 27a of the pin is in contact with the spherical elements 33b and which are situated radially innermost. The innermost situated spherical elements 33b are in turn in contact with the radially outermost, spherical elements 33a, which partly are contained in a circumferentially extended cavity 35. This cavity is substantially bowl-shaped with a diameter that is larger than the diameter of the spherical elements and with a defined angle with respect to the horizontal plane corresponding to the contact surface of the spherical elements with the housing. Since the upper part 27a of the pin is slightly inclined, the pin 27 will hold a pressure in the radial direction outwardly and thus hold the spherical elements 33a-b radially outwards in the direction of the cavity 35. At the same time, the piston 17 is subjected to a pressure in the lifting direction, due to the gas pressure that prevails in the housing 3 and the area difference between the upper and the lower part of the piston. Thus, the radially outermost spherical elements 33a-b are pushed in the lifting direction of the piston stem 5 towards an upper portion of the cavity, whereby the spherical elements 33a-b and the pin will be remained locked in this position as long as the pin is situated in this first position.

Below the piston, a release mechanism 9 in the shape of a low-resistant pressing solenoid is arranged. It is as mentioned before connected to a crash detector and can, when receiving an electrical pulse, be released. The solenoid comprises a striking element 37 in the shape of a spring biased plunger, where the spring constant is adapted so as not to put the plunger 37 in motion by the movements and vibrations of the vehicle, e.g. a strike-through of the spring-system. It is in the recessed position located on a small distance from the lower surface of the pin, usually a couple of mm.

Electrical contact occurs by means of a pressure resistant lead-through 38 (see FIG. 1-5) in the housing 3, or by isolating the housing 3 and the rod 5 by means of spherical elements of a ceramic material without any conducting properties and by contacting each end of the rod.

When activating the lifting device 1, the solenoid 9 will receive a signal from the crash detector which results in that the plunger 37 projects and hits the lower side of the pin 27. Since the plunger 37 is situated on a small distance from the lower side, prior to the commencement of the activation, it will reach a speed before the strike. This is of great importance since the plunger 37 only needs to accelerate its own mass, not the pin's 27, but also that the kinetic energy of the plunger 37 will be converted to a force during the impact, like a firing pin of a revolver. The sum of the kinetic energy and the compressive force of the plunger 37 during its movement overcome the static friction of the pin 27 against the spherical elements and put them in motion.

Due to this firing pin effect in combination with the compressive force of the solenoid, the pin 27 will start to move from the first, lower position in the direction of a second, upper position. When the position p, where the upper part 27a of the pin transforms into the intermediate part, passes the centers of the spherical elements, the spherical elements 33a-b will start to get pushed inwards in the radial direction. The reason is that the tangent in the point, where the radially outermost positioned spherical elements 33a are in contact with the cavity 35, forms a positive angle $\alpha$ (see FIG. 7) with respect to the horizontal plane, at the same time as the spring tension of the piston 17 pushes the radially outermost located spherical elements vertically upwards.

When the point p of the pin passes the centre of the spherical elements 33a-b, the component force, which is directed radially inwards and which originate from the spring tension, will assist in the movement of the pin 17 so that the spherical elements are forced radially inwards until they not are in engagement with the cavity 35. At the same moment, the piston stem 5 will start to move upwards until it hits the stop element 16 which prevents further movement. In this suspended position, the piston will be springing and can absorb several impacts against the hood. The pin 27 is all the time situated in its second, upper position, in which the compression spring 29 is recessed, since the spherical elements 33a-b locked by the diameter of the housing, prevent the tap from moving towards the first, lower position under the influence of the compression spring.

Accordingly, a large tightened force can be released with a relatively low release force due to the above mentioned construction, in which the geometry of the pin and of the cavity, the contact of the spherical elements with the latter during the load of the gas spring, is optimized so as to easily release the operating element, without sacrificing the locking of the lifting element.

Since the lifting device 1 is reversible, it is possible to restore the piston stem 5 to normal, locked position. This is accomplished by pressing the piston stem 5 downwards, and when the spherical elements 33a-b are on the same level as the cavity 35, the outermost spherical elements 33a will be pushed into it, so that the piston stem 5 is locked due to the spring-tensioned pin and the slightly inclined upper part of the pin 27a, which secures that the spherical elements start to move in the direction of the radial outer position.

Instead of manually pushing the piston stem downwards, some form of automatic drawing-in device could be provided for restoring the piston stem to its normal position again.

The lifting device is of course not only restricted to lifting the rear edge of the hood, but it is also conceivable to use the lifting device in crash frames or in other respects where the demand for a rapid and efficient lifting exist.

Of course it is conceivable to use a coil spring instead for a gas spring to provide for the lifting force.

The invention claimed is:

1. A lifting device to be mounted in a motor vehicle and intended, in case the vehicle is involved in an accident, to be activated so as to put a lifting element under a spring tension in the lifting device in motion, wherein the lifting device comprises:
   a locking device intended to cooperate with the lifting element for locking the lifting element in a spring-tensioned position, and
   a release mechanism comprising a striking element intended to release the lifting element, when locked, by means of striking-pin action so the lifting element can be put in motion under the influence of the spring tension; wherein the locking device comprises:

a plurality of spherical elements, and an operating element being movable in a lifting direction of the lifting element, wherein the striking element is situated at a distance from the operating element and intended to strike the operating element from below for moving the operating element from a first position, in which the operating element cooperates with the spherical elements so as to lock the lifting element in the lifting direction, to a second position, situated above the first position.

2. Lifting device according to claim 1, comprising a housing extended in the lifting direction, in which housing the lifting element, the locking device and the release mechanism are arranged, wherein the operating element when situated in the first position, the spherical elements are held in a radial outer position with respect to the lifting direction, and in which they are engaged with the housing for locking the lifting element with respect to the housing, and when situated in the second position, the spherical elements have moved to a radial inner position, in which they no longer are engaged with the housing.

3. Lifting device according to claim 2, wherein the housing comprises on the inside of the housing a circumferentially extended cavity for receiving the spherical elements when they are held in the radial outer position.

4. Lifting device according to claim 2, wherein the locking device comprises radially extended ducts in which the spherical elements are movably arranged.

5. Lifting device according to claim 4, wherein each in the radial direction extended duct comprises a plurality of successively arranged spherical elements.

6. Lifting device according to claim 2, wherein the locking device forms part of the spring-tensioned lifting element, and the spherical elements are arranged in the locking device in such a way that that said spring tension forces the spherical elements, from the radial outer position to the radial inner position when the operating element has reached the second position.

7. Lifting device according to claim 2, wherein the operating element comprises an upper substantially cylindrical portion and a lower cylindrical portion, the upper portion having a larger diameter than the lower portion, wherein the upper portion is intended to be in contact with the spherical elements when the operating element is situated in the first position so as to hold the spherical elements in the radial outer position.

8. Lifting device according to claim 1, wherein the operating element is resiliently arranged by means of a compression spring in the locking device in such a way that the spring is tensioned when the operating element is moved from the first position to the second position.

9. Lifting device according to claim 8, wherein the spring constant of the compression spring is chosen so that the spherical elements will be put in motion towards the outer position, when the operating element is moved from the second position to the first position in situations when the lifting element is pushed in the opposite direction as the lifting direction and the spherical elements reach the radial outer position.

10. Lifting device according to claim 9, wherein the upper portion is inclined with an angle ($\beta$) of 1-10.degree., slightly outwards seen in the lifting direction.

11. Lifting device according to claims 2, wherein the housing forms a pressure tight space in which an overpressure can prevail and where the lifting element is intended to function as a piston in a gas spring.

12. Lifting device according to claim 11, wherein the striking element at rest is located at a distance from the underside of the operating element.

13. Lifting device according to claim 12, wherein the distance is within the interval 1-10 mm.

14. Lifting device according to claim 1, wherein the striking element forms part of a low-resistant pushing solenoid.

15. Lifting device according to claim 3, wherein the angle ($\alpha$) between the tangent, in the point where the spherical elements are in contact with the cavity when the operating element is situated in the first position, and the horizontal plane lies within the interval 20-40°.

* * * * *